United States Patent [19]

Dorsch et al.

[11] 4,277,396
[45] Jul. 7, 1981

[54] THIAZOLEDIAZACYANINE DYESTUFFS

[75] Inventors: Hans-Lothar Dorsch, Cologne; Karl H. Hermann, Leverkusen, both of Fed. Rep. of Germany

[73] Assignee: Bayer Aktiengesellschaft, Leverkusen, Fed. Rep. of Germany

[21] Appl. No.: 971,719

[22] Filed: Dec. 21, 1978

[30] Foreign Application Priority Data

Dec. 24, 1977 [DE] Fed. Rep. of Germany ....... 2758107

[51] Int. Cl.$^3$ .............................................. C09B 45/00
[52] U.S. Cl. .................................. 260/146 R; 260/158
[58] Field of Search ............................ 260/146 R, 158

[56] References Cited

U.S. PATENT DOCUMENTS

| 2,835,661 | 5/1958 | Straley et al. | 260/146 R |
| 2,864,812 | 12/1958 | Bossard et al. | 260/146 |
| 3,812,093 | 5/1974 | Fisher et al. | 260/146 R |
| 3,874,847 | 4/1975 | Ohkawa et al. | 260/158 |
| 4,046,752 | 9/1977 | Hohmann et al. | 260/146 R |
| 4,082,740 | 4/1978 | Mohr et al. | 260/146 R |

Primary Examiner—Helen M. S. Sneed

Attorney, Agent, or Firm—Sprung, Felfe, Horn, Lynch & Kramer

[57] ABSTRACT

Cationic dyestuffs of the formula $$\left[ \begin{array}{c} R_1 \\ R_2 \diagdown N \\ \phantom{R_2}\diagup \phantom{N} \\ R_3 \diagup S \end{array} \!\!\!\!\!\!\!\!\! \begin{array}{c} \phantom{x} \\ -N{=}N- \end{array} \!\!\!\!\!\! \begin{array}{c} R_4 \\ \diagdown \phantom{N} \diagup R_5 \\ \phantom{X}\diagup N \diagdown \\ \phantom{X} R_6 \end{array} \right]^{+} X^{-}$$

wherein
  $R_1$ represents a lower alkyl, alkenyl or hydroxyalkyl radical,
  $R_2$, $R_3$, $R_5$ and $R_6$ represent hydrogen or a lower alkyl or alkenyl radical,
  $R_4$ represents a lower alkyl, alkenyl or alkoxy radical and
  $X^-$ represents an anion, are suitable for dyeing and printing natural and synthetic materials, in particular polyacrylonitrile and acid-modified polyamides and polyesters.

3 Claims, No Drawings

THIAZOLEDIAZACYANINE DYESTUFFS

The invention relates to cationic dyestuffs of the general formula

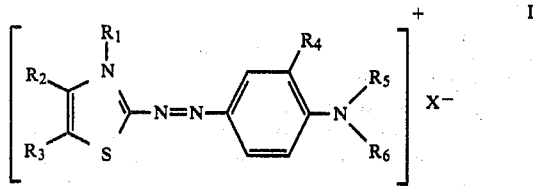

wherein $R_1$ represents a lower alkyl, alkenyl or hydroxyalkyl radical, $R_2$, $R_3$, $R_5$ and $R_6$ represent hydrogen or a lower alkyl or alkenyl radical, $R_4$ represents a lower alkyl, alkenyl or alkoxy radical and $X^-$ represents an anion, and their preparation and use for dyeing and printing natural and synthetic materials, in particular polyacrylonitrile and acid-modified polyamides and polyesters.

By lower alkyl and alkoxy radicals there are understood, in particular, straight-chain or branched radicals with 1 to 4 C atoms.

Lower alkenyl radicals are, above all, the allyl, butenyl and i-butenyl radical.

The anion $X^-$ can be derived from inorganic and organic acids.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and meta-phosphate; radicals of carbonic acid, such as bicarbonate and carbonate; further anions of oxygen acids and complex acids, such as methosulphate, ethosulphate, hexafluosilicate, cyanate, thiocyanate, trichlorozincate and tetrachlorozincate, tribromozincate and tetrabromozincate, borate and tetrafluoborate, as well as anions of esters of boric acid, such as of the glycerol ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of formic acid, acetic acid, chloroacetic acid, cyanoacetic acid, hydroxyacetic acid, aminoacetic acid, methylaminoacetic acid, aminoethyl-sulphonic acid, methylaminoethyl-sulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyl-tetraethylene glycolether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9–11 carbon atoms (Versatic Acid 911 from SHELL), acrylic acid, methacrylic acid, crotonic acid, propargylic acid, oxalic acid, malonic acid, succinic acid, glutaric acid, adipic acid, pimelic acid, suberic acid, the isomer mixture of 2,2,4- and 2,4,4-trimethyladipic acid, sebacic acid, isosebacic acid (isomer mixture), tartaric acid, citric acid and glyoxylic acid.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Examples of suitable anions of aromatic carboxylic acids are the anions of substituted and unsubstituted benzoic acid and of phthalic acid, tetrachlorophthalic acid, 4-hydroxyphthalic acid, 4-methoxyphthalic acid, isophthalic acid, 4-chloro-iso-phthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid mono-methyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid and n-dodecylbenzenesulphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are frequently also preferred.

The anion is in general decided by the preparation process and by the purification of the crude dyestuff which may be carried out. In general, the dyestuffs are in the form of zinc chloride double salts, acetates, methosulphates, ethosulphates or halides (especially chlorides or bromides). The anions can be replaced by other anions in a known manner.

Compounds of the general formula I in which $R_1$ denotes methyl, ethyl, hydroxyethyl or 3-hydroxy- and 2-hydroxy-propyl, $R_2$, $R_3$, $R_5$ and $R_6$ denote hydrogen, methyl or ethyl and $R_4$ denotes methyl or ethyl, form a preferred group of the dyestuffs according to the claims.

In this group, compounds of the general formula I in which $R_1$ represents methyl and 2-hydroxyethyl, $R_2$ and $R_3$ represent hydrogen, $R_4$ represents methyl and $R_5$ and $R_6$ represent hydrogen and methyl, are to be singled out in particular.

The claimed dyestuffs of the general formula I can be obtained by reacting azo dyestuffs of the general formula

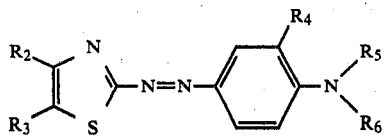

in which $R_2$–$R_6$ have the abovementioned meaning, with compounds having an alkylating action, of the formula $$R_1-X,$$

wherein $R_1$ has the meaning given in the case of formula I and

X is a group which yields an anion $X^-$, or with oxiranes of the present formula

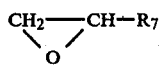

in which $R_7$ represents hydrogen, methyl or ethyl, reacts.

The following compounds can preferably be employed as the alkylating agent $R_1$—X: alkyl or alkenyl esters of hydrogen halide acids, such as methyl, ethyl, propyl, butyl or allyl chloride, bromide or iodide, lower dialkyl sulphates, such as dimethyl and diethyl sulphate, and the lower alkyl esters of aromatic sulphonic acids, such as the methyl, ethyl, propyl and butyl ester of benzenesulphonic acid or toluenesulphonic acid.

Suitable oxiranes of the formula III are ethylene oxide, propylene oxide and butylene oxide.

The dyestuffs II are quaternised by warming in an inert organic solvent, for example in hydrocarbons, such as benzene, toluene or xylene, halogenated hydrocarbons, such as carbon tetrachloride, tetrachloroethane, chlorobenzene or o-dichlorobenzene, nitrated hydrocarbons, such a nitromethane, nitrobenzene or nitronaphthalene, or in dimethylformamide, acetonitrile, sulpholane or dimethylsulphoxide, equivalent amounts of the substances of the formula $R_1$—X having an alkylating action preferably being used.

In some cases, it is also possible to use water or an alcohol as the reaction medium.

The reaction of the azo dyestuffs II with oxiranes of the formula III is effected in water or in organic solvents, inorganic or organic acids which yield the anion $X^-$ being added.

The azo dyestuffs of the general formula II are obtained in the customary manner by diazotising aminothiazoles of the general formula

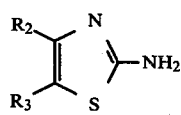

in which $R_2$ and $R_3$ have the abovementioned meaning, and coupling the diazotisation product to aromatic amines of the general formula

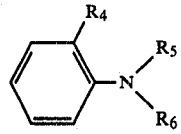

in which $R_4$–$R_6$ have the abovementioned meaning.

Suitable diazo components (IV) are: 2-aminothiazole, 2-amino-4-methyl-thiazole, 2-amino-5-methyl-thiazole, 2-amino-4-ethyl-thiazole, 2-amino-5-ethyl-thiazole, 2-amino-4-propyl-thiazole, 2-amino-5-propyl-thiazole, 2-amino-4-n-butyl-thiazole, 2-amino-5-n-butyl-thiazole, 2-amino-4,5-dimethyl-thiazole, 2-amino-4,5-diethyl-thiazole, 2-amino-4-methyl-5-ethyl-thiazole and 2-amino-4-ethyl-5-methyl-thiazole.

Suitable coupling components (V) are: 2-methyl-aniline, 2-ethyl-aniline, 2-i-propyl-aniline, 2-methyl-N-methyl-aniline, 2-methyl-N-ethyl-aniline, 2-methyl-N-propyl-aniline, 2-methyl-N-allyl-aniline, 2-methyl-N-n-butyl-aniline, 2-ethyl-N-methyl-aniline, 2-ethyl-N-ethyl-aniline, 2-methyl-N,N-dimethyl-aniline, 2-methyl-N,N-diethyl-aniline and 2-ethyl-N,N-dimethyl-aniline.

Compared with the corresponding compounds which are not substituted in the o-position relative to the amino group, the bathochromic shift in the light absorption of the new dyestuffs is very high. The dyestuffs are suitable for dyeing and printing materials made of leather, tannin-treated cotton, cellulose, synthetic high molecular weight polyamides and high molecular weight polyurethanes, and lignin-containing fibres. They are furthermore suitable for the preparation of writing fluids, rubber-stamp inks and ball-point pen pastes and can also be used in flexographic printing.

However, the dyestuffs according to the invention are particularly suitable for dyeing—from an aqueous liquor or from organic solvents—and printing fibres, slivers, woven fabrics or knitted fabrics made of polyacrylonitrile or of copolymers of acrylonitrile with other vinyl compounds, such as vinyl chloride, vinylidene chloride, vinyl fluoride, vinyl acetate, vinylpyridine, vinylimidazole, vinyl alcohol, acrylic acid esters and methacrylic acid esters, acrylamides and methacrylamides and assymetric dicyanoethylene, or flocks, fibres filaments, slivers, woven fabrics or knitted fabrics made of acid-modified polyamide fibres. Examples of acid-modified aromatic polyesters are polycondensation products of sulphoterephthalic acid and ethylene glycol, that is to say polyethylene glycol terephthalates containing sulphonic acid groups (of the DACRON 64 type from E.I. DuPont de Neumors and Company), such as are described in Belgian Patent Specification No. 549,179 and U.S. Pat. No. 2,893,816.

The dyeings of the dyestuffs of the formula I according to the invention on materials made of polyacrylonitrile or acid-modified polyester fibres or polyamide fibres are distinguished by very good fastness to light, wet processing, rubbing and sublimation. The dyestuffs are also distinguished by a good affinity and good ease of combination.

The good migration properties of the dyestuffs according to the claims, which makes it possible to produce uniform dyeings on acrylonitrile fibres, even in light shades, without high dyeing technology requirements and without the addition of retarders.

The starting components employed in the examples which follow were synthesised by the route described in DE-AS (German Published Specification) Nos. 1,057,706 and 1,088,631.

EXAMPLE 1

21.8 g of the azo dyestuff of the following formula

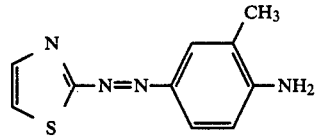

are dissolved in 200 ml of chloroform. After adding 0.2 g of magnesium oxide, the solution is heated to the reflux. 12.6 g of dimethyl sulphate are added dropwise in the course of ½ hour. The reaction mixture is then boiled under reflux for 3 hours and cooled. After filtering off, 28 g of a dyestuff of the formula

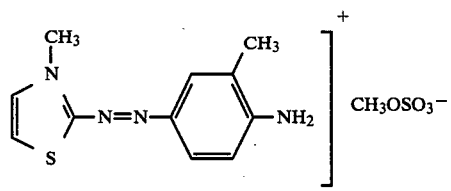

are obtained, which dyes polyacrylonitrile fibres and acid-modified polyester fibres uniformly in red-violet shades.

EXAMPLE 2

21.8 g of the azo dyestuff employed in Example 1 are reacted with 15.4 g of diethyl sulphate as described in that example. 27 g of a dyestuff of the formula

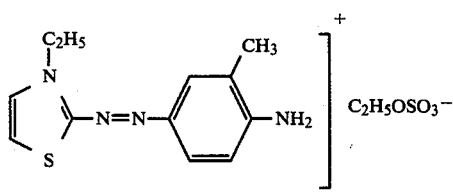

are obtained, which dyes polyacrylonitrile fibres and acid-modified polyester fibres uniformly in red-violet shades.

EXAMPLE 3

21.8 g of the azo dyestuff described in Example 1 are dissolved in 100 ml of glacial acetic acid. Ethylene oxide is introduced into this solution at a temperature of 40°–50° C. until the starting compound can no longer be detected by thin layer chromatography. Thereafter, most of the glacial acetic acid is distilled off in vacuo. The residue which remains is dissolved in a little water. After adding sodium chloride and zinc chloride, 30.5 g of a dyestuff of the formula

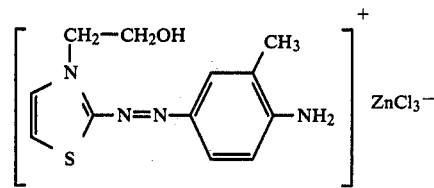

precipitate. The dyestuff dyes polyacrylonitrile fibres and acid-modified polyester fibres uniformly in red-violet shades.

EXAMPLE 4

24.6 g of the azo dyestuff of the formula

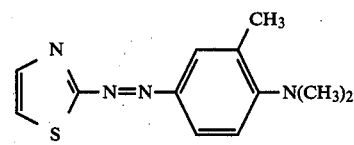

are reacted with 12.6 g of dimethyl sulphate by a process analogous to that described in Example 1. 29 g of a dyestuff of the formula

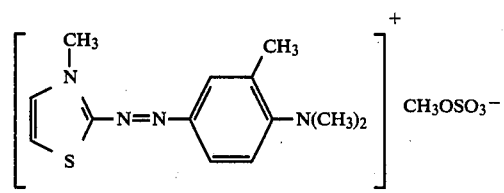

are obtained, which dyes polyacrylonitrile fibres and acid-modified polyester fibres uniformly in clear blue shades.

EXAMPLE 5

24.6 g of the azo dyestuff described in Example 4 are reacted with 15.4 g of diethyl sulphate. 28 g of a blue dyestuff of the formula

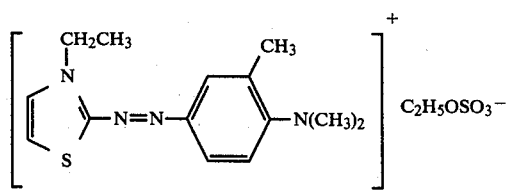

are obtained, which gives uniform dyeings on polyacrylonitrile fibres and acid-modified polyester fibres.

EXAMPLE 6

24.6 g of the azo dyestuff described in Example 4 are reacted with ethylene oxide as described in Example 3. 32 g of a dyestuff of the formula

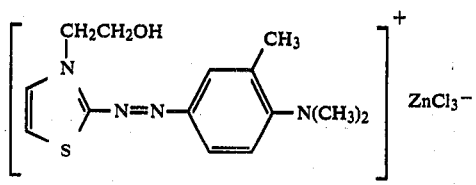

are obtained, which gives clear uniform blue dyeings on polyacrylonitrile fibres and acid-modified polyester fibres.

Further valuable dyestuffs which can be prepared by the processes described in Examples 1-6 are listed in the Table which follows. The structure of the dyestuffs corresponds to the general formula

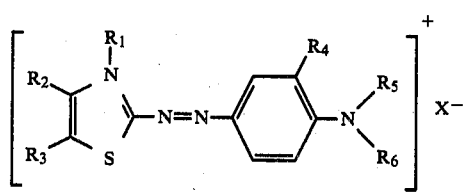

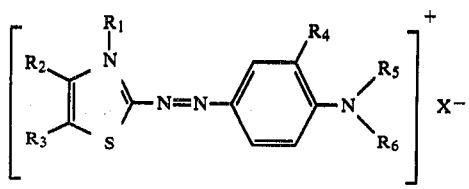

wherein
$R_1$ represents a lower alkyl, alkenyl or hydroxylalkyl radical,
$R_2$, $R_3$, $R_5$ and $R_6$ represent hydrogen or a lower alkyl radical,
$R_4$ represents a lower alkyl, alkenyl or alkoxy radical and
$X^-$ represents an anion, 2. Dyestuffs according to claim 1, in which
$R_1$ represents methyl, ethyl, 2-hydroxyethyl or 3-hydroxy- or 2-hydroxy-propyl,
$R_2$, $R_3$, $R_5$ and $R_6$ represent hydrogen, methyl or ethyl and
$R_4$ represents methyl or ethyl.

3. Dyestuffs according to claim 1, in which
$R_1$ represents methyl or 2-hydroxyethyl,
$R_2$ and $R_3$ represent hydrogen,
$R_4$ represents methyl and
$R_5$ and $R_6$ represent hydrogen or methyl.

TABLE 1

| Example No. | $R_1$ | $R_2$ | $R_3$ | $R_4$ | $R_5$ | $R_6$ | X | Shade on PAN |
|---|---|---|---|---|---|---|---|---|
| 7 | CH$_3$ | H | H | C$_2$H$_5$ | H | H | CH$_3$OSO$_3$ | red-violet |
| 8 | C$_2$H$_5$ | " | " | " | " | " | C$_2$H$_5$OSO$_3$ | " |
| 9 | C$_2$H$_4$OH | " | " | " | " | " | ZnCl$_3$ | " |
| 10 | CH$_2$CH$_2$CH$_3$ | " | " | CH$_3$ | " | " | Br | " |
| 11 | CH$_2$CHOHCH$_3$ | " | " | " | " | " | ZnCl$_3$ | " |
| 12 | CH$_2$CH=CH$_2$ | " | " | " | " | " | Br | " |
| 13 | CH$_3$ | " | " | CH(CH$_3$)$_2$ | " | " | CH$_3$OSO$_3$ | " |
| 14 | C$_2$H$_4$OH | " | " | " | " | " | ZnCl$_3$ | " |
| 15 | CH$_3$ | " | " | OCH$_3$ | " | " | CH$_3$OSO$_3$ | violet |
| 16 | C$_2$H$_4$OH | " | " | " | " | " | ZnCl$_3$ | " |
| 17 | CH$_3$ | " | " | CH$_3$ | CH$_3$ | " | CH$_3$OSO$_3$ | " |
| 18 | C$_2$H$_4$OH | " | " | " | " | " | ZnCl$_3$ | " |
| 19 | C$_2$H$_5$ | " | " | " | " | " | C$_2$H$_5$OSO$_3$ | " |
| 20 | CH$_3$ | " | " | " | C$_2$H$_5$ | " | CH$_3$OSO$_3$ | " |
| 21 | C$_2$H$_4$OH | " | " | " | " | " | ZnCl$_3$ | " |
| 22 | CH$_2$CHOHCH$_3$ | " | " | " | CH$_3$ | CH$_3$ | " | blue |
| 23 | CH$_3$ | " | " | " | " | C$_2$H$_5$ | CH$_3$OSO$_3$ | " |
| 24 | C$_2$H$_4$OH | " | " | " | " | " | ZnCl$_3$ | " |
| 25 | CH$_2$CH=CH$_2$ | " | " | " | " | CH$_3$ | Br | " |
| 26 | CH$_2$CH$_2$CH$_3$ | " | " | " | " | " | " | " |
| 27 | CH$_2$CH=CH$_2$ | " | " | " | " | " | " | " |
| 28 | CH$_2$CH=CH$_2$ | H | H | C$_2$H$_5$ | H | H | " | red-violet |
| 29 | CH$_3$ | " | " | CH$_3$ | CH$_3$ | H | Br | violet |
| 30 | C$_2$H$_4$OH | " | " | C$_2$H$_5$ | " | CH$_3$ | CH$_3$OSO$_3$ | blue |
| 31 | CH$_3$ | CH$_3$ | " | " | " | " | ZnCl$_3$ | " |
| 32 | C$_2$H$_5$ | " | " | CH$_3$ | H | H | CH$_3$OSO$_3$ | violet |
| 33 | C$_2$H$_4$OH | " | " | " | " | " | C$_2$H$_5$OSO$_3$ | " |
| 34 | CH$_3$ | " | " | C$_2$H$_5$ | " | " | ZnCl$_3$ | " |
| 35 | C$_2$H$_4$OH | " | " | " | " | " | CH$_3$OSO$_3$ | " |
| 36 | CH$_3$ | " | " | CH$_3$ | CH$_3$ | " | ZnCl$_3$ | blue-violet |
| 37 | C$_2$H$_4$OH | " | " | " | " | " | CH$_3$OSO$_3$ | " |
| 38 | CH$_3$ | " | " | " | CH$_3$ | CH$_3$ | ZnCl$_3$ | blue |
| 39 | C$_2$H$_4$OH | " | " | " | " | " | CH$_3$OSO$_3$ | " |
| 40 | CH$_3$ | H | CH$_3$ | " | H | H | ZnCl$_3$ | violet |
| 41 | " | " | " | " | CH$_3$ | " | " | blue-violet |
| 42 | C$_2$H$_4$OH | " | " | " | H | " | ZnCl$_3$ | violet |
| 43 | " | " | " | " | CH$_3$ | " | " | blue-violet |
| 44 | CH$_3$ | " | " | " | " | CH$_3$ | CH$_3$OSO$_3$ | blue |
| 45 | C$_2$H$_4$OH | " | " | " | " | " | ZnCl$_3$ | " |
| 46 | CH$_3$ | CH$_3$ | " | " | H | H | CH$_3$OSO$_3$ | violet |
| 47 | C$_2$H$_4$OH | " | " | " | " | " | ZnCl$_3$ | " |
| 48 | CH$_3$ | CH$_3$ | CH$_3$ | CH$_3$ | CH$_3$ | H | CH$_3$OSO$_3$ | blue-violet |
| 49 | C$_2$H$_4$OH | " | " | " | " | " | ZnCl$_3$ | " |
| 50 | CH$_3$ | " | " | " | " | CH$_3$ | CH$_3$OSO$_3$ | blue |
| 51 | C$_2$H$_4$OH | " | " | " | " | " | ZnCl$_3$ | " |

We claim:
1. Dyestuffs of the formula